(12) United States Patent
Tieu

(10) Patent No.: US 8,189,284 B2
(45) Date of Patent: May 29, 2012

(54) QUIET RETRACTION SYSTEM

(75) Inventor: Triet Minh Tieu, Frisco, TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 12/646,423

(22) Filed: Dec. 23, 2009

(65) Prior Publication Data
US 2010/0157467 A1 Jun. 24, 2010

Related U.S. Application Data

(60) Provisional application No. 61/140,176, filed on Dec. 23, 2008.

(51) Int. Cl.
*G11B 21/02* (2006.01)
(52) U.S. Cl. .......................................................... 360/75
(58) Field of Classification Search .................. None
See application file for complete search history.

(56) References Cited

U.S. PATENT DOCUMENTS

| 6,721,119 | B1* | 4/2004 | Hassan et al. ............... 360/75 |
| 7,042,673 | B2* | 5/2006 | Jeong ............................. 360/75 |
| 7,054,091 | B2* | 5/2006 | Swize ............................ 360/75 |
| 7,190,542 | B2* | 3/2007 | Yeo et al. ..................... 360/69 |

* cited by examiner

*Primary Examiner* — K. Wong
(74) *Attorney, Agent, or Firm* — John J. Patti; Wade J. Brady, III; Frederick J. Telecky, Jr.

(57) ABSTRACT

A quiet retraction method for regulating constant velocity while parking an arm within a disk drive is described. The method comprises the steps of: driving a motor for the arm using a first drive current for a first period; floating the motor; sampling a back electromotive force (bemf) for a first sampled voltage, while floating the motor; driving the motor with a second drive current during a second period in response to sampling the bemf; determining whether the second drive current exceeds a current limit; estimating the bemf using the first sampled voltage when the second drive current exceeds the current limit; driving the motor with a third current during a third period in response to estimating the bemf; wherein driving the motor with the first, second, and third currents quietly parks the arm, while regulating the constant velocity.

21 Claims, 7 Drawing Sheets ers within the figures are not necessarily to scale, emphasis instead being

QUIET RETRACTION SYSTEM

CROSS REFERENCE TO RELATED APPLICATION(S)

The present application claims priority to jointly owned U.S. Provisional Application corresponding to application No. 61/140,176 entitled "Silent Retract." This provisional application was filed on Dec. 23, 2008.

DESCRIPTION OF RELATED ART

With the evolution of electronic devices, there is a continual demand for enhanced speed, capacity and efficiency in various areas including electronic data storage. Motivators for this evolution may be the increasing interest in video (e.g., movies, family videos), audio (e.g., songs, books), and images (e.g., pictures). Optical disk drives have emerged as one viable solution for supplying removable high capacity storage. Effective writing and reading data from an optical disk mean that an arm should be moved precisely to and from a parked position.

BRIEF DESCRIPTION OF THE DRAWINGS

The quiet retraction system may be better understood with reference to the following figures. The components within the figures are not necessarily to scale, emphasis instead being placed upon clearly illustrating the principles of the invention. Moreover, in the figures, like reference numerals designate corresponding parts or blocks throughout the different views.

Figure 1:
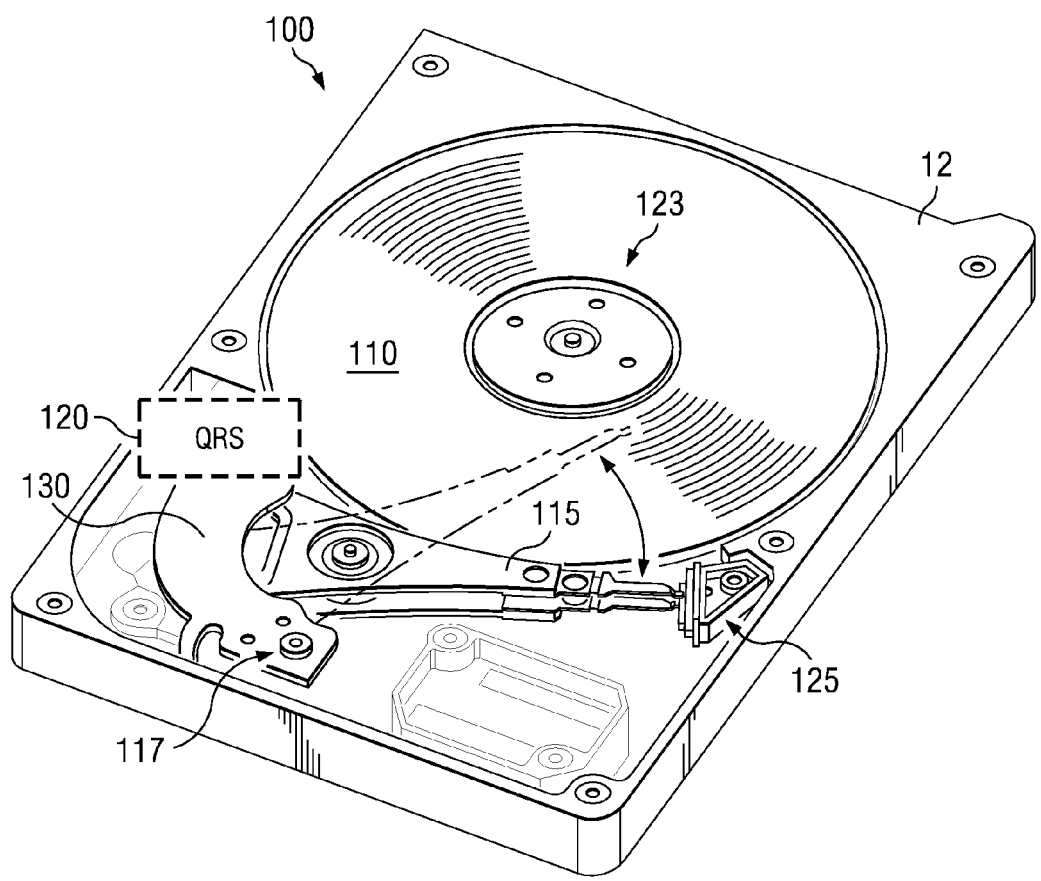
FIG. 1 is a system drawing illustrating components within an optical disk drive.

While the quiet retraction system is susceptible to various modifications and alternative forms, specific embodiments have been shown by way of example in the drawings and subsequently are described in detail. It should be understood, however, that the description herein of specific embodiments is not intended to limit the quiet retraction system to the particular forms disclosed. In contrast, the intention is to cover all modifications, equivalents, and alternatives falling within the spirit and scope of the quiet retraction system as defined by this document.

DETAILED DESCRIPTION OF EMBODIMENTS

As used in the specification and the appended claim(s), the singular forms "a," "an" and "the" include plural referents unless the context clearly dictates otherwise. Similarly, "optional" or "optionally" means that the subsequently described event or circumstance may or may not occur, and that the description includes instances where the event or circumstance occurs and instances where it does not.

Turning now to FIG. 1, is a system drawing illustrating components within an optical disk drive 100. This disk drive includes an optical media 110 (e.g., a magnetic disk) that stores data, which can be accessed either during a read or write operation. An arm 115 can extend across the disk 110, for example, during a write operation. A voice coil motor (VCM) 117 can control the movement of the arm 115. However, the arm 115 may reside in a rest, or parked, position during a read operation. The disk drive 100 includes a quiet retraction system (QRS) 120 that substantially reduces acoustic noise that maybe associated with parking the arm 115. For example, there may be an acoustic (singing) threshold, or current level that makes noise during retract. In addition, this acoustic threshold may be the point at which a user determines that the acoustic noise becomes apparent. With the QRS 120, this threshold is programmable and this system reduces acoustic noise for each individual threshold. The QRS 120 assesses when a magnitude of the drive current exceeds a singing threshold and then derives the drive current differently with a much lower frequency, which substantially reduces the acoustic noise. Moreover, this system facilitates this quiet retract, while maintaining a substantially constant back electromotive force (bemf).

The disk drive 100 may be a Contact Start/Stop (CSS) typed disk drive where the parking area is in an Inside Diameter, such as the area 123. Alternatively, this disk drive may be a ramp-typed disk drive where the parking area is on the ramp located toward the Outside Diameter, such as the area 125. The QRS 120 may use a constant velocity retract. Constant velocity is a technique driving the VCM while maintaining a constant Back Electro Motive Force (Bemf).

The velocity of the arm is proportional to the Bemf generated by the VCM. Determining the Bemf can be done by measuring the voltage across the VCM 117 when it is floating, or not driven. The driving current may regulate the velocity of the arm 115. In the disk drive 100, a magnet 130 within the VCM 117 strongly pulls this arm when it approaches a crash stop in the area 125. An alternative implementation may not include this magnet or may include more than one magnet. Floating the VCM 117 and determining the Bemf may take a finite duration and depend on the amplitude of the driven current, the QRS 120 facilitates effectively controlling the velocity of the arm even at relatively high initial velocities by sampling the Bemf when the VCM is floating.

Figure 2:
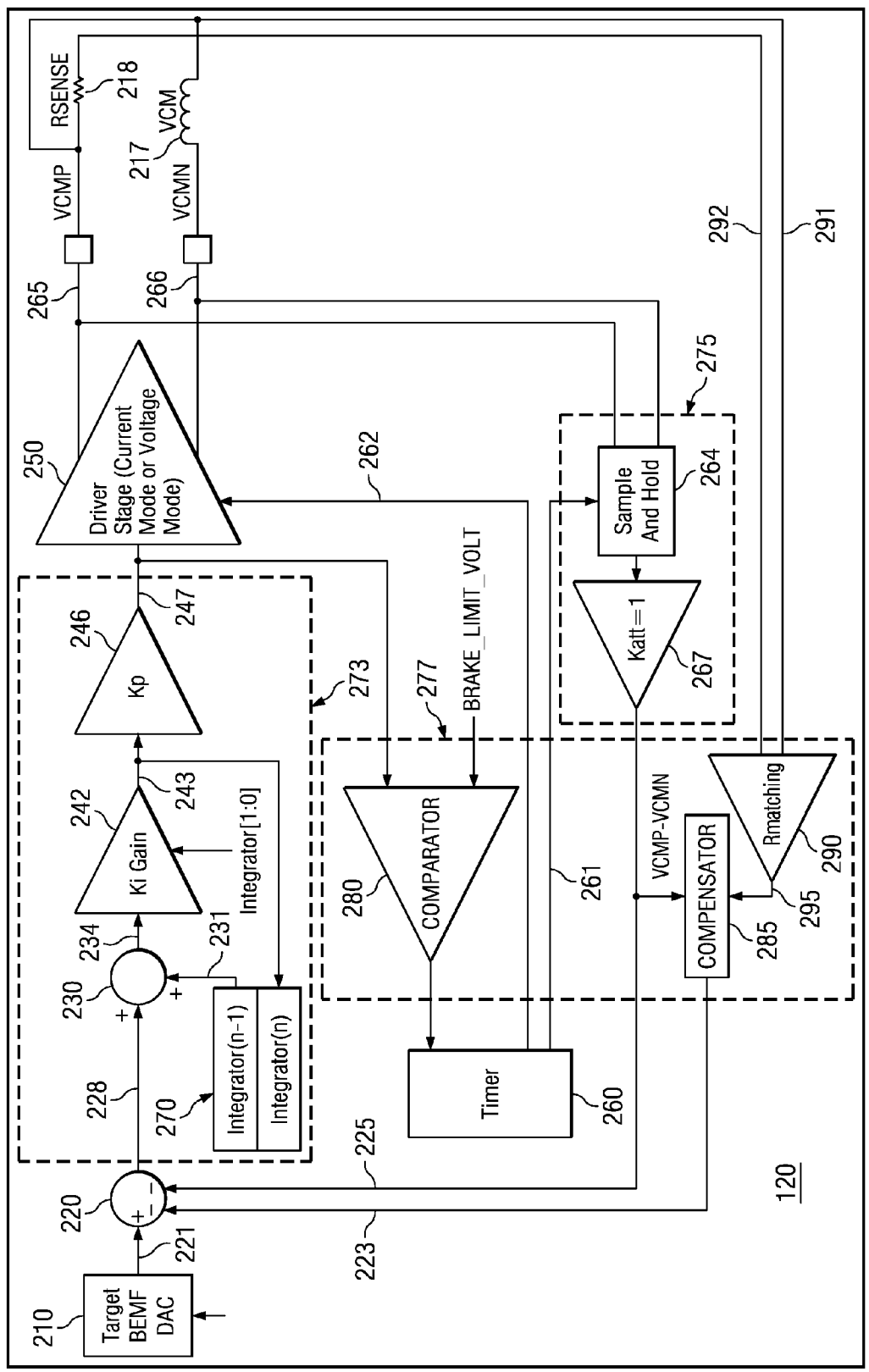
FIG. 2 is a block diagram of the QRS of FIG. 1.

FIG. 2 is a block diagram of the QRS 120. For a specific design, a target velocity may be chosen, which may have units of inches per second, or ips. The relationship between the Bemf and target velocity may be characterized by the following equation: Target_Bemf=Ke*Target_Velocity, where Ke is an electrical motor constant with units of Volts/ips. Therefore, selecting a target velocity enables calculation of a target Bemf with units of Volts. A converter 210 may receive the target Bemf, which may be a target Bemf digital to analog converter (DAC) and transmit a converted signal.

A device 220 may have one input terminal 221 that receives the converted signal from the converter 210, where the device 220 and converter 210 can be referred to as an error circuit. In addition, this device may have other input terminals 223-225 for receiving other types of signals. While the device 220 is shown with three input terminals, any number of alternative implementations may occur my varying the number of input terminals. Moreover, the device 220 may be an analog adder/subtractor in one implementation that transmits a first combined signal, such as a Bemf error signal, on terminal 228. A device 230 receives the first combined signal on the terminal 231 and transmits a second combined signal on a terminal 234. In addition, this device may have other input terminals, such as input terminal 231. The device 230 may be an analog adder in one implementation.

The QRS 120 also includes two series-connected gain stages. The gain stage 242 receives the second combined signals and increases it in accordance with a first gain factor, such as integrator gain Ki. The gain stage 242 transmits a first gain signal on the terminal 243. A gain stage 246 receives the first gain signal and increases it in accordance with a second gain factor, such as a proportional gain Kp. As this gain stage transmits a second gain signal on the terminal 247, a driver stage 250 can receive this gain signal, or current signal. This driver stage can transmit either drive current or a drive voltage that controls the VCM 217. In one implementation, the device 230, integrator 270, gain stage or circuit 242, and gain stage or circuit 246 may form a current determination block or circuit 273.

As mentioned with reference to FIG. 1, VCM 217 may float, or not be driven, for a short duration such that the flyback dies out. When this motor is not floating, a timer 260 may transmit a drive timing signal along terminal 262 that controls how the driver stage 250 drives the VCM 117. For example, the drive timing signal from this timer may be active for its duty cycle, which would mean that a drive current or drive voltage may be sent to this VCM for this same duty cycle. In addition, this timer transmits a sample timing signal when the VCM 117 is floating along the terminal 261.

A sample and hold block or circuit 264 has input terminals 265-266 that connect to output terminals of the driver stage 250, while another input terminal receives the sample timing signal. The sample and hold block 264 may be an Analog To Digital converter with a switched cap. Consequently, the voltage across the terminals 265-266 approximately equals the sum of the voltage across the motor and the Bemf. Floating the VCM enables effective sampling of the Bemf because the voltage across VCM 117 is approximately the Bemf. The sample and hold block 264 may transmit a sampled signal to a third gain stage or circuit 267. This gain stage may have an associated factor Katt, which may be approximately one, and transmit a third gain signal to the device 220 via the terminal 225. In one implementation, the sample and hold block 264 and gain stage or circuit 267 may form a sample block or circuit 275.

The device 220 can determine the Bemf error and transmit as the first combined signal on the terminal 228. The Bemf error may be the difference between the target Bemf, or converted signal, and the sampled Bemf that leaves the gain stage 267, or third gain signal. For the nth sample of the Bemf, the following formula may be used in calculating the Bemf error: Error(n)=Target_Bemf-Bemf(n). The device 230 receives the error signal, first combined signal.

An integrator 270 also connects to the device 230 so it can determine the second combined signal. Using the integrator 270, device 230 and gain stage 242, the Bemf error gets integrated and multiplied by the integrator gain, which produces the second combined signal. The following formula may be used: Integrator(n)=Ki*(Error(n)+Integrator(n−1)). Using the device 246, the output of the integrator is multiplied by a the proportion gain Kp. Then the driver stage 250 can receive the second gain signal, or the signal from the gain stage 246. The following formula may be used: Driver_Stage_Input=Kp*Integrator(n). Since the singing threshold is programmable, one can set a corresponding limit. As long as the drive current or drive voltage for the VCM 217 is less than this limit (e.g., predetermined brake voltage limit BRAKE_LIMIT_VOLT), Bemf sampling may continue.

As mentioned above, the timer 260 can control how long the driver stage 250 drives, or remains on. The timing duration for the ON time may the time Ton, while the floating time, or timing duration for the OFF may be the time Toff. Both of these may be programmable.

The QRS 120 also includes a comparator 280, compensator 285, and a matching device or circuit 290. The comparator 280 may assess a signal value applied to the terminal 247 relative to a limit, such as the voltage limit BRAKE_LIMIT_VOLT. When the signal on this terminal exceeds the limit, this comparator may transmit an update signal to the timer 260. The comparator 280 may be one of many types of comparators, and the timer 260 and comparator 208 can form at least a portion of a mode selection circuit. In response to receiving the update signal, the timer 260 may extend the drive time, such as a drive time in the range of approximately 10 ms to approximately 20 ms or some other suitable range. This may be done by transmitting a silent pulse with duration between approximately 10 ms to approximately 20 ms. Similarly, when the signal on the terminal 247 is below the limit, the timer 260 may return to the original drive time range of approximately 0.3 ms to approximately 0.5 ms.

As the timer transmits the extended pulse, or silent pulse, the compensator 285 estimates the Bemf, since the Bemf is sampled less frequently because of the longer pulse duration. The matching device 290 has input terminals 291-292 positioned across a sense resistor Rsense. In one implementation, this matching device may be a differential amplifier that applies a differential signal to the terminal 295, which is the input of the compensator 285. In one implementation, the compensator 285 may be a subtraction circuit. It may be implemented with either analog logic or digital logic. In an analog design, the subtraction circuit may be designed as a capacitor with charges added or drained. In the digital design, the subtraction circuit may be designed as an analog to digital converter; other digital circuits may add or subtract the output of this converter.

Since this compensator 285 receives both the differential signal on terminal 295 and the third gain signal on the terminal 225, the compensator 285 can apply a compensated signal to the terminal 223, which reflects an estimated Bemf. As a result, the device 220 can determine a new first combined, or error, signal based on the target Bemf received on terminal 221, compensated signal on terminal 223, and the $3^{rd}$ gain signal on terminal 225. This produces several other signals as previously described, which eventually results in a drive current or a drive voltage that drives the VCM 117. In one implementation, the comparator 280, compensator 285, and matching device may form an estimation block or circuit 277.

Quiet Retract System in Current Mode

How the compensator 285 does Bemf estimation may be understood with reference to either a current mode driver stage or a voltage mode driver stage. This first explanation will focus on the current mode driver stage. When the driver stage 250 is in current mode, the current following through the coil 217 of the VCM 117 may be fixed. For a given Bemf sample, the voltage across the coil is the sum of the Bemf voltage for the sample with the product of the current through the coil, or Ivcm, and the total resistance across this VCM, or Rtotal. But Rtotal may be defined by the following formula: Rtotal=Rfet+Rmotor+Rsense, where Rfet is the resistance of the silicon power device, Rmotor is the resistance of the motor, and Rsense is the resistance of a sense resistor, like sense resistor 218.

Using these relationships, the voltage difference between samples may be governed by the following formulas:

VCM($n$−1)=$I$vcm($n$−1)*$R$total+Bemf($n$−1),for a sample "$n$-1" where V CM is the voltage across the VCM 117 in current mode VCM($n$)=$I$vcm($n$)*$R$total+Bemf($n$),for a sample "n" where V CM is the voltage across the VCM 117 in current mode Since the driver stage 250 is in current mode and the Ivcm is fixed, the voltage difference between these samples is approximately the differences between the Bemfs as illustrated in the following formula:

$$VCM(n)-VCM(n-1)=Bemf(n)-Bemf(n-1)=DELTA\_BEMF$$

Knowing how the actual Bemf changed between from the last samples enables estimation of the Bemf for a future sample as illustrated in the following formula:

$$Bemf(n)=Bemf(n-1)+DELTA\_BEMF$$

By estimating the Bemf, the frequency of actual, or physical, Bemf samples may be reduced, which correspondingly reduces acoustic noise. In other words, the number of actual Bemf values receive on the input terminals of the sample and hold block 264 may be reduced. Instead, the compensator 285 produces estimated Bemfs using the DELTA_BEMF.

The voltage difference across the VCM 117 between samples may be a large signal voltage, such as a voltage of approximately 5 V. But the voltage across the sense resistor may be amplified with a fixed gain, which facilitates making two measurements. Instead of measuring this difference directly, there may be two separate measurements made as indicated in the following formula:

$$A=VCM(n-1)-[I(n-1)*Rsense]*Rmatching, \text{where A is a measurable signal for the sample "n-1"}$$

$$B=VCM(n)-[I(n)*Rsense]*Rmatching, \text{where B is a measurable signal for the sample "n"}$$

But Rmatching is programmable and may be selected as approximately the ratio of $R$total/$R$sense. By subtracting B from A, the Bemf delta may be determined and the Bemf estimated as indicated below:

$$B-A=VCM(n)-VCM(n-1)=DELTA\_BEMF$$

$$Bemf(n)=Bemf(n-1)+DELTA\_BEMF=Bemf(n-1)+(B-A), \text{where Bemf}(n-1) \text{ is the last measured Bemf before the singing threshold}$$

As long as the drive current remains above the limit (e.g., singing threshold), the QRS 120 estimates the Bemf using the formula above, which coordinates with the duration of the silent pulse produced by the timer 260. When this extended pulse expires, the driver stage 230 stops driving and the VCM 117 floats, which facilitates actually sampling the Bemf. And, that process continues until the driven current becomes larger than a set limit, like the singing threshold; the timer 260 sends regular pulses to the driver stage. At this point, the QRS 120 estimates the Bemf; the timer 260 sends extended pulses to the sample and hand hold block 240. The normal retract pulses and the extended, or Silent Retract, pulses will cooperate until the arm 114 finally parks.

Quiet Retract System in Voltage Mode

Estimating the Bemf may also be done when the driver stage is in voltage mode. For this mode, the voltage across the coil is fixed and characterized by: VCM=VCMP−VCMN. For two consecutive samples "n−1" and "n" in the voltage mode, VCM(n)=VCM(n−1), which means that the following is true:

$$VCM(n-1)=I(n-1)*R+Bemf(n-1)$$

$$VCM(n)=I(n)*R+Bemf(n)$$

$$VCM(n-1)-VCM(n)=0=R*[I(n)+I(n-1)]+[Bemf(n)-Bemf(n-1)]$$

With these relationships, it is possible to determine the delta of the Bemf and the estimated Bemf as indicated below:

$$DELTA\_BEMF=Bemf(n)-Bemf(n-1)=-R*[I(n)-I(n-1)]$$

$$Bemf(n)=Bemf(n-1)+DELTA\_BEMF$$

The product of R*I may be a large signal voltage, such as a voltage of approximately 5 V. But the voltage across the sense resistor may be amplified with a fixed gain, which facilitates making two measurements. Instead of measuring this difference directly, there may be two separate measurements made as indicated in the following formula:

$$A=VCM(n-1)-[I(n-1)*Rsense]*Rmatching$$

$$B=VCM(n)-[I(n)*Rsense]*Rmatching$$

But Rmatching is programmable and may be selected as approximately the ratio of Rtotal/Rsense. By subtracting B from A, the Bemf delta may be determined and the Bemf estimated as indicated below:

$$B-A=-(Rsense*Rmatching)*[I(n)-I(n-1)]$$

But here, (B−A) is very close to the ideal DELTA_BEMF. This difference depends on effective in matching (Rsense*Rmatching) to Rmotor. The error in the DELTA_BEMF (in percentage) is $$100*((Rsense*Rmatching)-Rtotal)/Rtotal(\%)$$

For example, if Rsense=⅓ ohm and R=11 ohm, then ideally, Rsense*Rmatching=R. So, (⅓)*Rmatching=11, or Rmatching=33. If the amplifier designed for Rmatching is 30, the error of the DELTA_BEMF is, 100*((⅓)*30−11)/11=−9%.

For the voltage mode, the DELTA_BEMF estimate has an error introduced by the matching of the designed amplifier (Rmatching) versus the ratio of the total resistance and the sense resistance (R/Rsense). With this, the Bemf may be estimated as indicated below:

$$ESTIMATE\_DELTA\_BEMF=-(Rsense*Rmatching)*[I(n)-I(n-1)]DELTA\_BEMF=-(R)*[I(n)-I(n-1)]$$
$$Bemf(n)=Bemf(n-1)+ESTIMATE\_DELTA\_BEMF=Bemf(n-1)+(B-A), \text{where Bemf(n-1) is the last measured Bemf before the singing threshold}$$

As long as the drive current remains above the limit (e.g., singing threshold), the QRS 120 estimates the Bemf using the formula above, which coordinates with the duration of the silent pulse produced by the timer 260. When this extended pulse expires, the driver stage 230 stops driving and the VCM 117 floats, which facilitates actually sampling the Bemf. And, that process continues until the driven current becomes larger than a set limit, like the singing threshold; the timer 260 sends regular pulses to the driver stage. At this point, the QRS 120 estimates the Bemf; the timer 260 sends extended pulses to the sample and hand hold block 240. The normal retract pulses and the extended, or Silent Retract, pulses will cooperate until the arm 114 finally parks.

Figure 3:
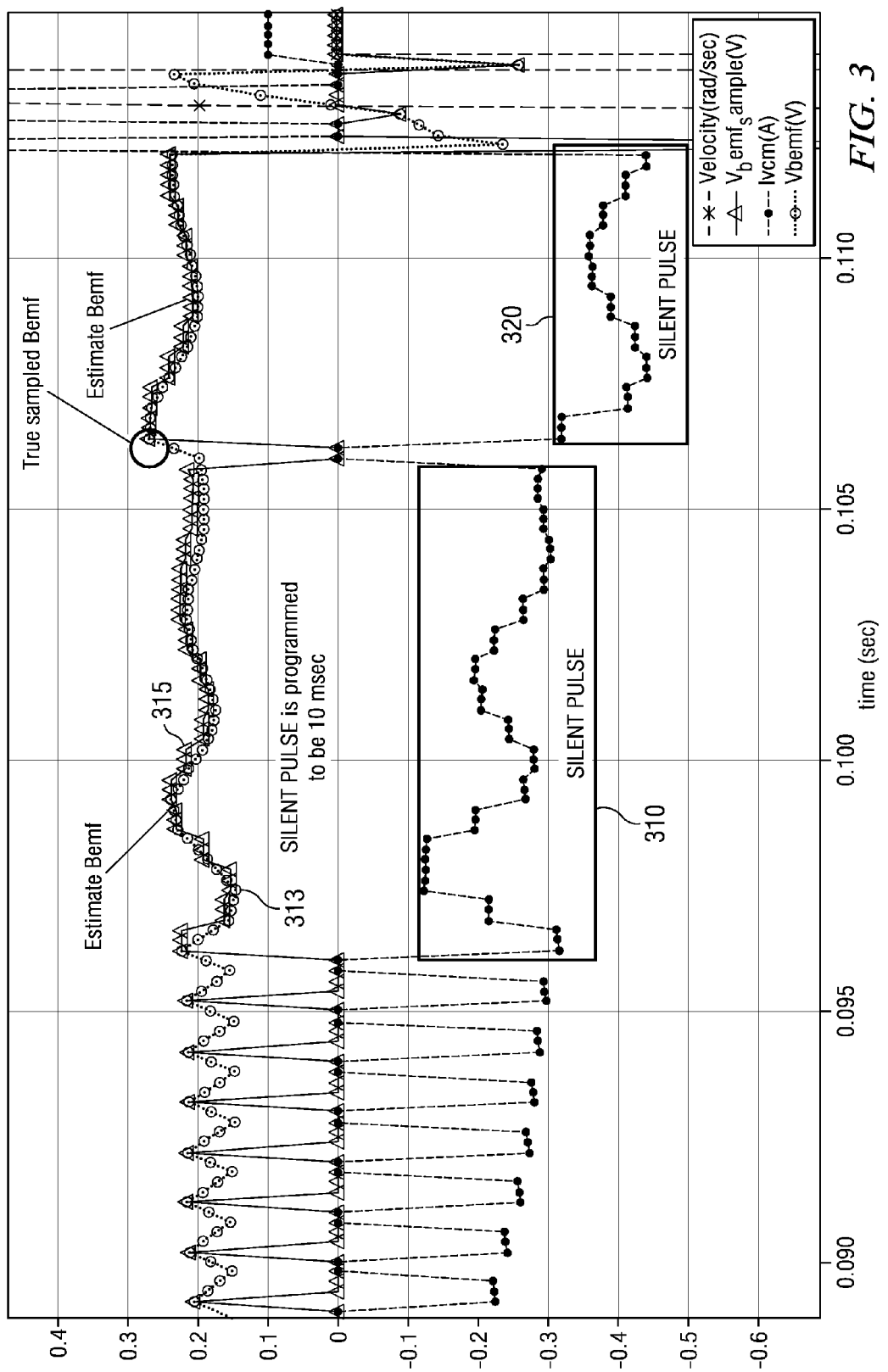
FIG. 3 is a plot illustrating two silent pulse regions where the QRS of FIG. 1 estimates the Bemf.

Turning now to FIG. 3, this figure is a plot illustrating two silent pulse regions where the QRS 12 estimates the Bemf. For the silent pulse associated with the region 310, the actual sampled Bemf is shown with the curve 313 that has "o" for each data point, while the estimated Bemf is shown with the curve 315 that has "+" for each data point. As illustrated in this figure, the QRS effectively estimates the Bemf, during the silent pulse region. The same applies for the silent pulse associated with region 320. The width of the Silent Retract pulse is programmable. The duration of the Silent Retract affects the accuracy of the estimator. The longer the duration, the more error may be introduced to the estimator and vice versa. While FIG. 3 illustrates the voltage mode, a similar drawing may be done for the current mode. In voltage mode, the accuracy of the estimator depends on the ability of matching Rmatching to the ratio Rtotal/Rsense. This error will introduce an offset into the closed loop. Purposely choosing the gain Rmatching difference from the ratio Rtotal/Rsense will compensate for the non-linearity of the motor constant (Kt).

Quiet Retract System Process

Figure 4:
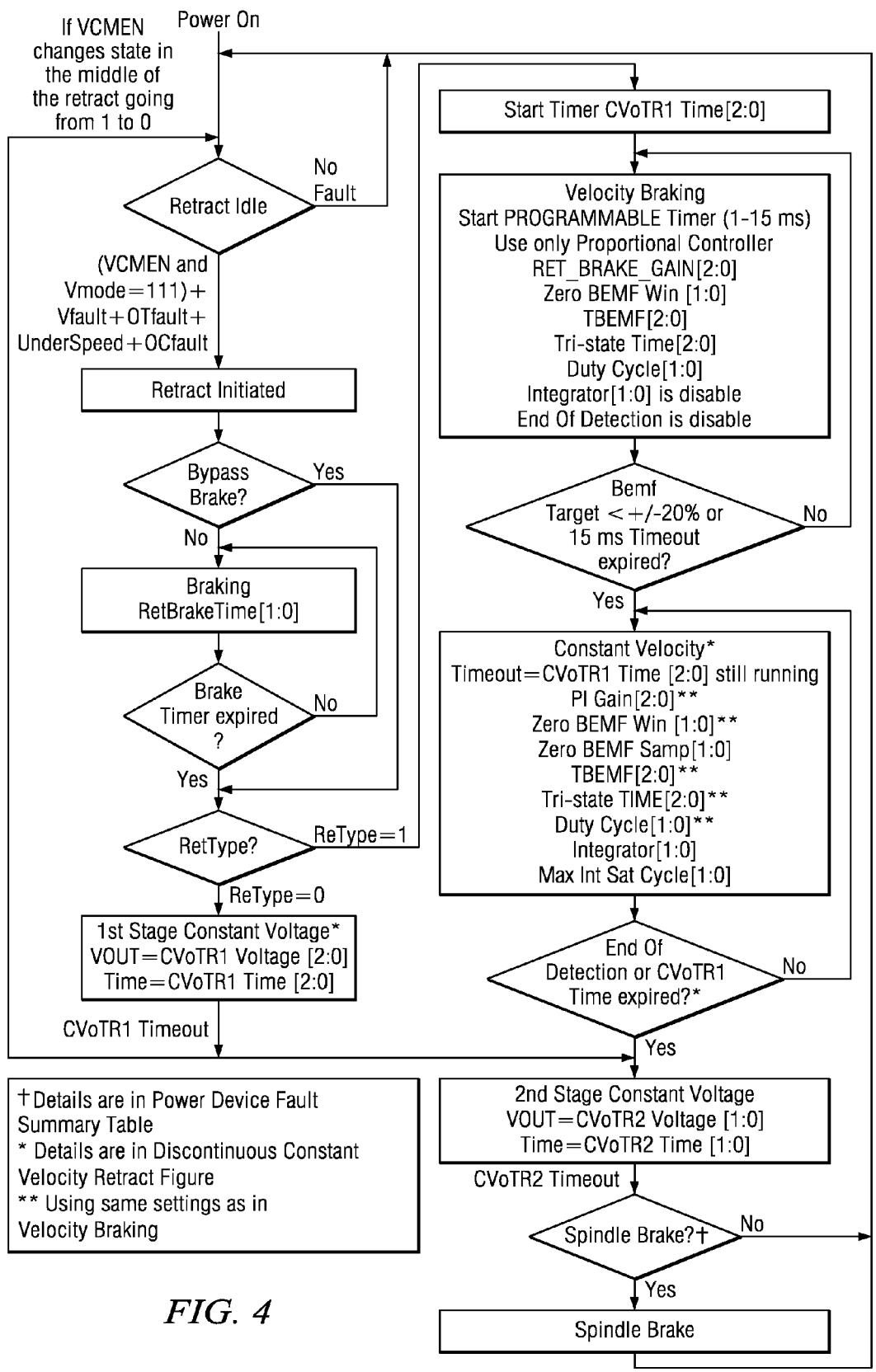
FIG. 4 shows the flow chart for the retract from a system level.
Figure 5A:
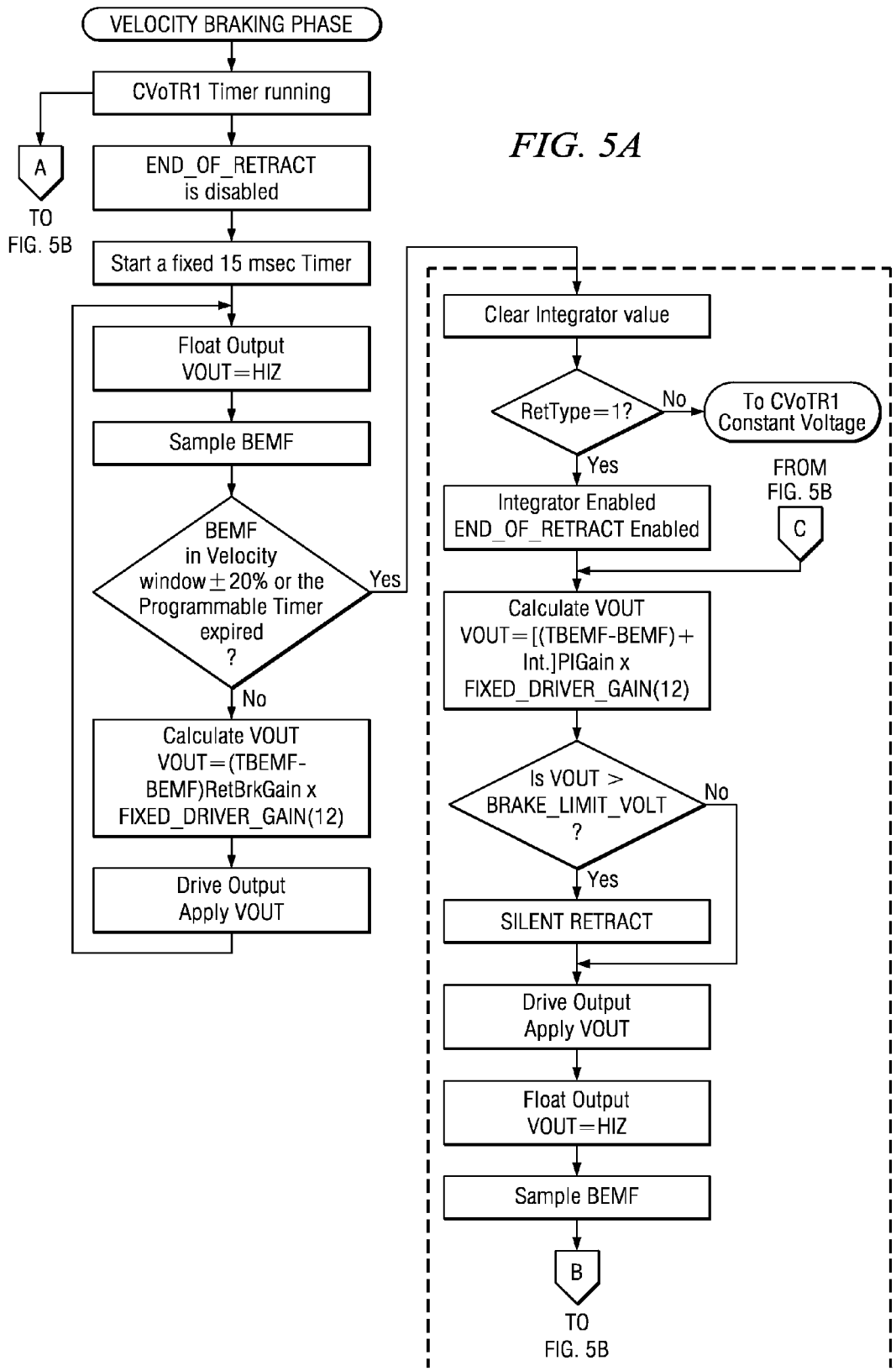
FIG. 5 shows the flow chart for the mechanism to regulate constant Bemf retract.
Figure 5B:
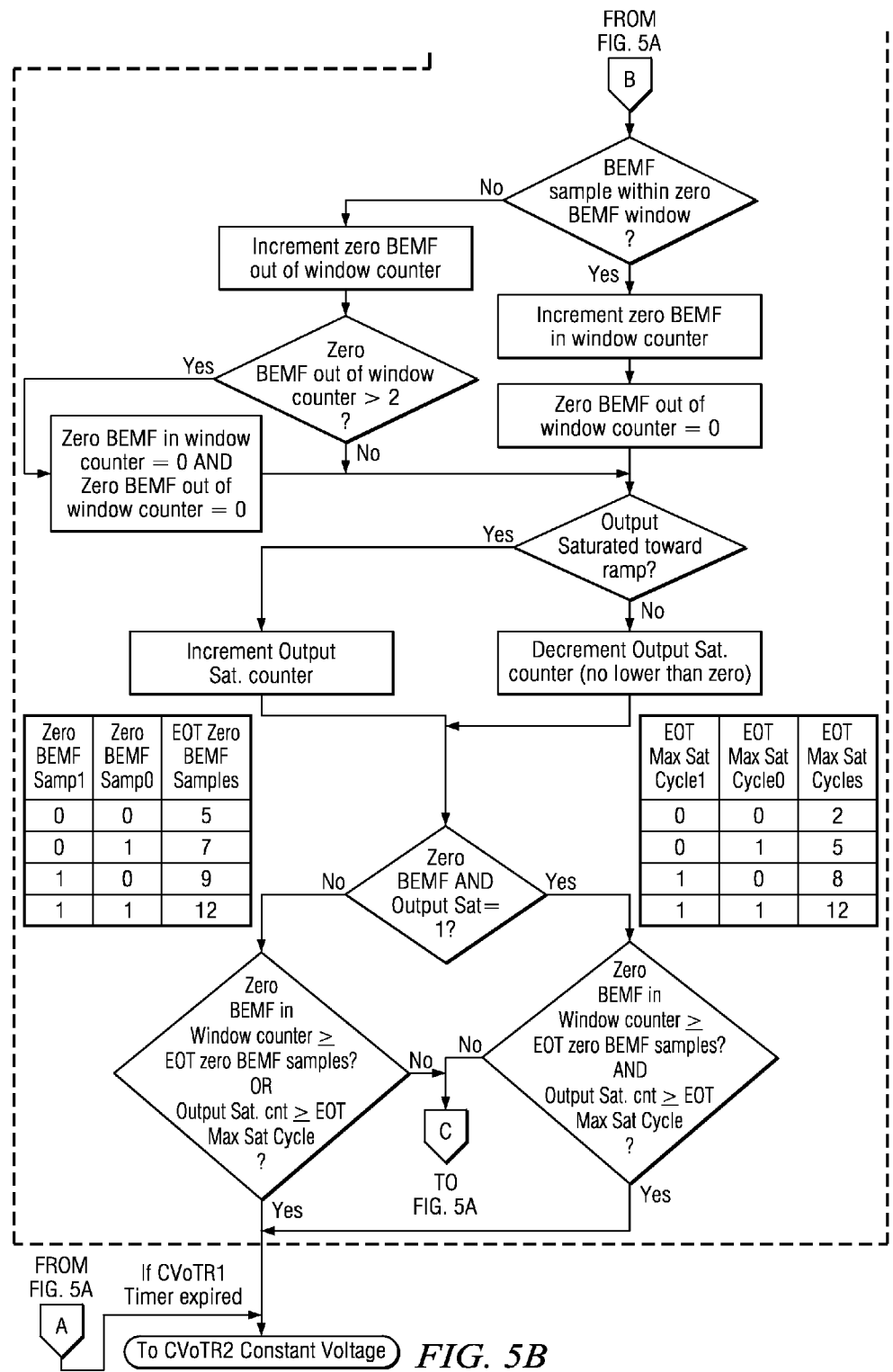
Figure 6:
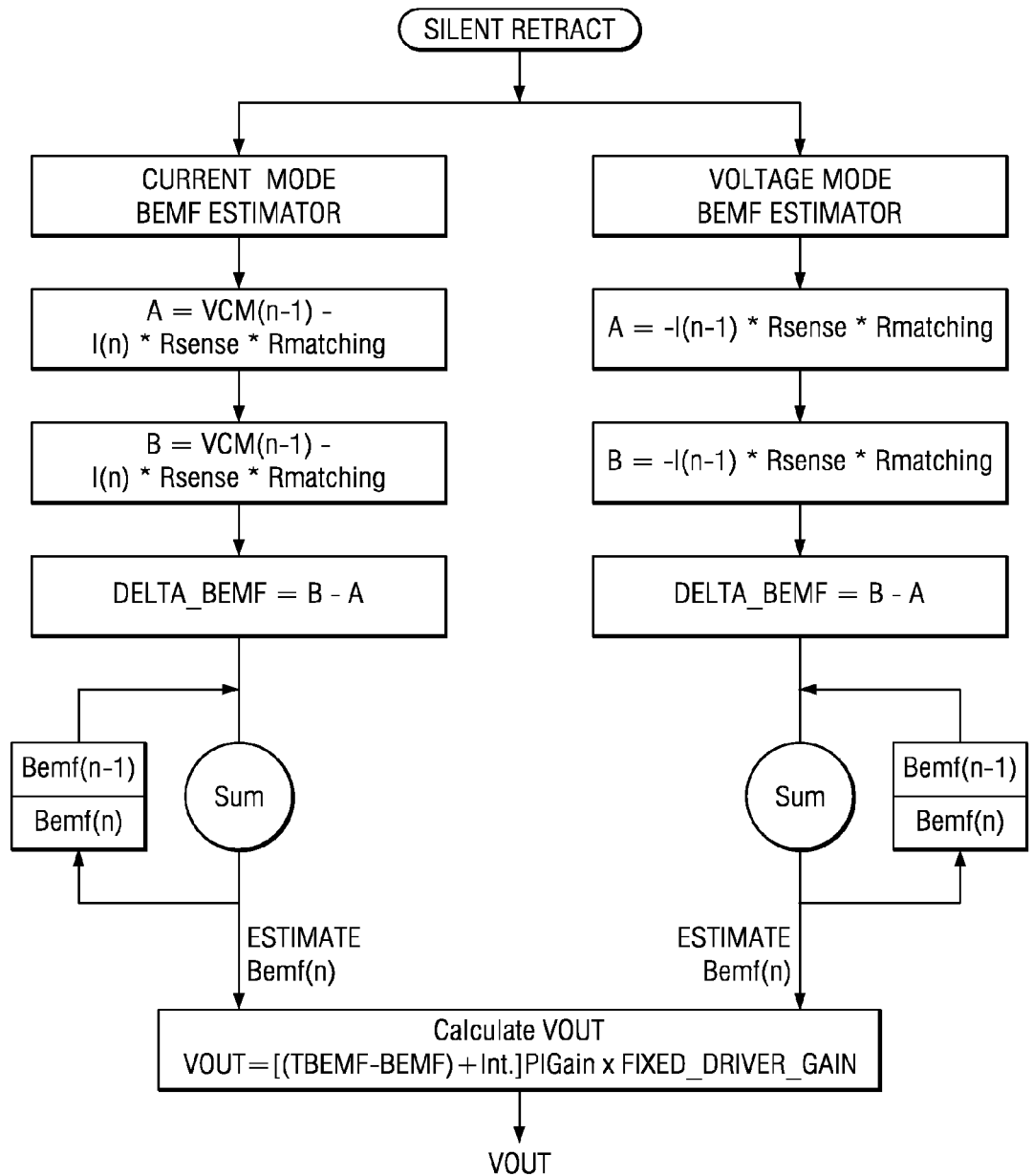
FIG. 6 shows the flow chart for Quiet Retract which is an extension to FIG. 5.

FIG. 4 shows the flow chart for the retract from a system level. FIG. 5 shows the flow chart for the mechanism to regulate constant Bemf retract. FIG. 6 shows the flow chart for Quiet Retract which is an extension to FIG. 5. In FIG. 5 there is a calculation for Vout; this calculation has the main variable as the Bemf. Quiet Retract, implemented in FIG. 6, will replace the Bemf with the Estimate Bemf.

Parts of the quiet retraction system 120 may be implemented within software as an ordered listing of executable instructions for implementing logical functions that can be embodied in any computer-readable medium. This medium may be for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example, but, not limited to, an electronic, magnetic, optical, electromagnetic, infrared, or semiconductor system, apparatus, device, or propagation medium. More specific examples (a non-exhaustive list) of the computer-readable medium can include the following: an electrical connection (electronic) having one or more wires, a portable computer diskette (magnetic). Note that the computer-readable medium can even be paper or another suitable medium upon which the program is printed. The program can be electronically captured, via for instance optical scanning of the paper or other medium, then compiled, interpreted or otherwise processed in a suitable manner if necessary, and then stored in a computer memory.

While various implementations of the quiet retraction system have been described, it may be apparent to those of ordinary skill in the art that many more embodiments and implementations are possible that are within the scope of this system. Although certain aspects of the quiet retraction system may be described in relation to specific techniques or structures, the teachings and principles of the present system are not limited solely to such examples. All such modifications are intended to be included within the scope of this disclosure and the present quiet retraction system and protected by the following claim(s).

The invention claimed is:

1. An apparatus for driving a voice coil motor (VCM), the apparatus comprising:
    an error circuit that receives a target back electromotive force (bemf) and that generates an error signal;
    a current determination circuit that is coupled to the error circuit;
    a driver that is coupled to the current determination circuit and that is configured to be coupled to the VCM;
    a mode selection circuit that is coupled to current determination circuit and the driver and that receives a threshold signal, wherein the mode selection circuit selects a normal mode when the output of the current determination circuit is less than the threshold signal and a silent mode when the output of the current determination circuit is greater than the threshold signal, and wherein the mode selection circuit provides at least one first pulse having a first width to the driver during the normal mode, and wherein the mode selection circuit alternately provides at least one second pulse having a second width and at least one third pulse having the first width, and wherein the second width is greater that the first width;
    a sampling circuit that is coupled to the driver, the mode selection circuit, and the error circuit, wherein the sampling circuit provides a measured bemf to the error circuit following the first and third pulses; and
    a silent mode compensation circuit that is configured to be coupled to the VCM and that is coupled to the error circuit, wherein silent mode circuit generates an estimated bemf following the second pulse.

2. The apparatus of claim 1, wherein the mode selection circuit further comprises:
    a comparator that is coupled to the current determination circuit and that receives the threshold signal; and
    a timer that is coupled to the comparator, the driver and the sampling circuit.

3. The apparatus of claim 2, wherein the sampling circuit further comprises:
    a sample and hold circuit that is configured to be coupled to the VCM and that is coupled to the timer; and
    a gain stage that is coupled to the sample and hold circuit, the silent mode compensation circuit, and the error circuit.

4. The apparatus of claim 3, wherein the silent mode compensation circuit further comprises:
    a matching circuit that is configured to be coupled to the VCM; and
    a compensator that is coupled to the gain stage, the matching circuit, and the error circuit.

5. The apparatus of claim 4, wherein the current determination circuit further comprises:
    an integration stage that is coupled to the error circuit; and
    a proportion stage that is coupled to the integration stage, the driver, and the comparator.

6. The apparatus of claim 5, wherein the error circuit further comprises:
    a digital-to-analog converter (DAC); and
    a subtractor that is coupled to the DAC, the gain stage, and the compensator.

7. The apparatus of claim 6, wherein the matching circuit further comprises a differential amplifier.

8. The apparatus of claim 7, wherein the sample and hold circuit further comprises an analog-to-digital converter (ADC).

9. An apparatus comprising:
    a housing;
    a storage medium secured to the housing;
    an access member that is secured to the housing;
    a VCM that is secured to the housing and that is configured to adjust the position of the access member; and
    a refraction circuit having:
        an error circuit that receives a target bemf and that generates an error signal;
        a current determination circuit that is coupled to the error circuit;
        a driver that is coupled to the current determination circuit and that is coupled to the VCM;
        a mode selection circuit that is coupled to current determination circuit and the driver and that receives a threshold signal, wherein the mode selection circuit selects a normal mode when the output of the current determination circuit is less than the threshold signal and a silent mode when the output of the current determination circuit is greater than the threshold signal, and wherein the mode selection circuit provides at least one first pulse having a first width to the driver during the normal mode, and wherein the mode selection circuit alternately provides at least one second pulse having a second width and at least one third pulse having the first width, and wherein the second width is greater that the first width;

a sampling circuit that is coupled to the driver, the mode selection circuit, and the error circuit, wherein the sampling circuit provides a measured bemf to the error circuit following the first and third pulses; and a silent mode compensation circuit that is coupled to the VCM and the error circuit, wherein silent mode circuit generates an estimated bemf following the second pulse.

10. The apparatus of claim 9, wherein the mode selection circuit further comprises:
a comparator that is coupled to the current determination circuit and that receives the threshold signal; and
a timer that is coupled to the comparator, the driver and the sampling circuit.

11. The apparatus of claim 10, wherein the sampling circuit further comprises:
a sample and hold circuit that is configured to be coupled to the VCM and that is coupled to the timer; and
a gain stage that is coupled to the sample and hold circuit, the silent mode compensation circuit, and the error circuit.

12. The apparatus of claim 11, wherein the silent mode compensation circuit further comprises:
a matching circuit that is configured to be coupled to the VCM; and
a compensator that is coupled to the gain stage, the matching circuit, and the error circuit.

13. The apparatus of claim 12, wherein the current determination circuit further comprises:
an integration stage that is coupled to the error circuit; and
a proportion stage that is coupled to the integration stage, the driver, and the comparator.

14. The apparatus of claim 13, wherein the error circuit further comprises:
a digital-to-analog converter (DAC); and
a subtractor that is coupled to the DAC, the gain stage, and the compensator.

15. The apparatus of claim 14, wherein the matching circuit further comprises a differential amplifier.

16. The apparatus of claim 15, wherein the sample and hold circuit further comprises an analog-to-digital converter (ADC).

17. The apparatus of claim 16, wherein the storage medium is a platter.

18. The apparatus of claim 17, wherein the access member is an arm.

19. A method for driving a voice coil motor (VCM), the method comprising:
during a normal mode, performing the steps of:
driving the VCM for a first interval having a first width;
disengaging the VCM for a second interval, wherein the second interval follows the first interval;
measuring a bemf from the VCM during the second interval;
determining an error signal from the measured bemf and a target bemf;
generating drive signal from the error signal;
determining whether the drive signal exceeds a threshold;
entering a silent mode if the drive signal exceeds a threshold, wherein, during the silent mode, performing the steps of:
driving the VCM for a third interval having a second width, wherein the second width is greater than the first width;
estimating a bemf following the third interval;
driving the VCM for a fourth interval having the first width
disengaging the VCM for a fifth interval, wherein the fifth interval follows the fourth interval; and
measuring a bemf from the VCM during the fifth interval.

20. The method of claim 19, wherein the steps of measuring further comprise:
sampling and holding a voltage value from the VCM; and
applying a gain to the sampled and hold voltage value.

21. The method of claim 20, wherein the second width is greater than 10 ms.

* * * * *